(12) United States Patent
Wivagg

(10) Patent No.: US 6,293,593 B1
(45) Date of Patent: Sep. 25, 2001

(54) COLLAR CLAMP ASSEMBLY FOR REPAIRING CORE SPRAY PIPING

(75) Inventor: Adrian Peter Wivagg, Tolland, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/422,088

(22) Filed: Oct. 21, 1999

(51) Int. Cl.[7] ............................................ F16L 55/18
(52) U.S. Cl. ........................... 285/15; 376/260; 376/282; 376/286; 376/463
(58) Field of Search ............................. 376/352, 282, 376/286, 277, 260, 463; 285/15, 179, 191; 29/723

(56) References Cited

U.S. PATENT DOCUMENTS

| | | |
|---|---|---|
| 793,589 | 6/1905 | Kellogg . |
| 4,078,832 | 3/1978 | Wittman ................................. 285/18 |
| 4,336,958 | 6/1982 | Goetzinger ............................. 285/55 |
| 4,653,782 | 3/1987 | Munday ................................ 285/373 |
| 5,007,666 * | 4/1991 | Kyfes ................................... 285/373 |
| 5,022,685 * | 6/1991 | Stiskin et al. ........................... 285/45 |
| 5,121,946 | 6/1992 | Jardine .................................. 285/15 |
| 5,735,551 | 4/1998 | Whitman et al. . |
| 5,737,380 | 4/1998 | Deaver et al. ........................ 376/352 |
| 5,868,434 * | 2/1999 | Brakland ................................ 285/15 |
| 5,947,529 * | 9/1999 | Jensen ................................ 285/123.6 |
| 5,964,029 | 10/1999 | Weems et al. .......................... 29/723 |
| 6,070,912 * | 6/2000 | Latham ................................... 285/61 |

FOREIGN PATENT DOCUMENTS

2197420 A    11/1987  (GB) .

* cited by examiner

*Primary Examiner*—Charles T. Jordan
*Assistant Examiner*—John Richardson

(57) ABSTRACT

A collar clamp assembly is disclosed for repairing and providing a temporary seal around leaking pipe coupling areas of an internal core spray system of a nuclear reactor. The clamp assembly includes first and second housings having respective first and second ends and a pair of longitudinal edges between the ends. The housings have a tongue and groove mating configuration along the longitudinal edges to seal and accommodate variations in the outside diameter of the core spray piping. A plurality of threaded fasteners are used to secure the first and second housings together to form a closed conduit shaped to receive a length of the core spray piping, including the leaking pipe coupling. First and second seals are located at first and second longitudinally spaced positions, respectively, on each of the first and second housings and extend around the closed conduit. The seals are oriented to seal the housings against the outer circumferential surfaces of the core spray piping on either side of the leaking pipe coupling. A grip structure configured to engage and grip an outer circumferential surface of the core spray piping is provided to prevent the pipe coupling from pulling apart in a longitudinal direction. Variations in the seals, the grip structure, and the housings are disclosed.

9 Claims, 7 Drawing Sheets

COLLAR CLAMP ASSEMBLY FOR REPAIRING CORE SPRAY PIPING

BACKGROUND OF THE INVENTION

1. Field of the Invention

The present invention relates generally to devices for repairing pipes. In particular, the present invention relates to an apparatus for repairing and providing a temporary seal around piping in an internal core spray-system of a nuclear reactor.

2. Description of the Related Art

The boiling water nuclear reactor industry has experienced extensive cracking in certain internal reactor parts. Among these parts is the core spray piping, which is presently being repaired or reviewed on most nuclear reactor plants.

The core spray piping functions to bring core spray flow through the core shroud from a source external to the reactor pressure vessel. The piping enters the vessel through a safe end above the shroud and immediately goes into a tee that divides the flow into two pipes. Each pipe curves around the interior of the vessel until it reaches a vertical section, and is supported with at least one support along the path. The vertical section extends down to the shroud where the piping enters through another safe end and terminates in a tee located in the sparger at the top of the shroud. There are typically two spray piping systems per reactor vessel which serve four half-circle spray spargers in the shroud. In most existing systems, the piping includes steel pipes and welded couplings which are susceptible to intergranular stress corrosion cracking due to the oxidizing environment of the reactor, welding process and the stagnant water typically present in the pipes.

The vertical section of piping typically includes a welded pipe coupling assembly immediately outside of the core shroud. This section of piping has been particularly prone to cracking, which can result in leakage or even structural damage to the internal core spray piping.

U.S. Pat. No. 5,735,551 issued to Whitman et al. discloses an L-shaped pipe repair apparatus for repairing the welded pipe assembly immediately outside of the core shroud. This apparatus includes first and second housings that are bolted together over the pipe to be repaired. A first seal is mounted within the housing assembly to seal against an outer circumferential surface of the pipe, and a second seal is mounted at an end of the housing assembly to seal against a wall of the core shroud. The housing assembly is retained in place against the outer wall of the core shroud by a threaded rod extending through the wall of the shroud or by a spring fixture that reacts against the wall of the reactor vessel.

The pipe repair apparatus of Whitman et al. suffers from the following disadvantages. First, the apparatus must be sized and machined precisely to fit the pipe to be repaired. The apparatus is not designed to accommodate differences in the outside diameters of the pipes. Second, the apparatus does not prevent cracks in the existing pipe from continuing to propagate and allowing the pipe to pull apart. Third, the L-shaped design of the apparatus is expensive to manufacture, difficult to install, and limits the versatility of the apparatus. The L-shaped design has limited usefulness in many cases since the cracks and leaks in the piping tend to occur in the welded couplings at varying distances above the elbow. The L-shaped design also prevents the apparatus from being used on straight sections of piping that are not adjacent to an elbow.

U.S. Pat. No. 5,737,380 issued to Deaver et al. discloses a replacement core spray line assembly for a nuclear reactor. This core spray line assembly provides a permanent repair of leaking or cracked core spray lines by replacing the lines with new pipes and connectors. This assembly does not provide a temporary repair assembly that can be quickly applied over existing piping as cracked conditions are found at a nuclear reactor plant.

Thus, there is a need for an improved apparatus that can be applied over existing piping to provide a temporary repair for cracked and/or leaking pipes and couplings in a boiling water nuclear reactor plant.

SUMMARY OF THE INVENTION

It is an object of the present invention to provide an apparatus for repairing cracked and/or leaking piping that solves the problems with the prior art arrangements described above.

It is a further object of the present invention to provide a pipe repair apparatus that is well adapted for remote installation, fast to install, reliable in use, and readily adapted to mate with the as-found conditions of a particular pipe configuration.

It is a still further object of the present invention to provide a pipe repair apparatus for core spray piping in a nuclear reactor that maintains the geometry of the original piping after installation, minimizes a leak rate upon a pipe break, has a long service life, accommodates any misalignment of the piping above and below the coupling, holds an end load equivalent to the original piping requirements, prevents axial movement of the piping in the event a pipe is broken and tends to pull apart, accommodates a possible axial movement of the piping should a pipe pull apart after breaking, and does not require preinstallation pipe preparation or measuring.

According to the present invention, a collar clamp assembly is provided for use as a temporary seal around a leaking pipe coupling of a core spray piping of a nuclear reactor. The collar clamp assembly comprises first and second housings having respective first and second ends and a pair of longitudinal edges between the ends. The housings have tongue and groove mating configurations along the longitudinal edges that provide a seal between the edges while allowing the housings to accommodate different outside diameters of pipe to be repaired. A plurality of fasteners secure the first and second housings together to form a closed conduit between the ends. The conduit is shaped to receive a length of the core spray piping including the leaking pipe coupling. First and second seals are located at first and second longitudinally spaced positions, respectively, on each of the first and second housings and extend around the closed conduit. The seals are generally coaxial and are oriented to seal the housings against an outer circumferential surface of the core spray piping on either side of the leaking pipe coupling.

The collar clamp assembly further comprises a grip structure configured to engage and grip an outer circumferential surface of the core spray piping and prevent the pipe coupling from pulling apart in a longitudinal direction. According to a first embodiment, the grip structure comprises a gripping ring installed in a groove adjacent to the respective first and second seals. In this embodiment, the first and second seals comprise raised metal rings formed on inner circumferential surfaces of the first and second housings.

According to a second embodiment, the grip structure is provided by the first and second seals themselves. In this embodiment, the seals comprise split washer locking rings having a sharp inner edge angled toward the leaking pipe coupling to engage the piping and prevent the pipe coupling from pulling apart in a longitudinal direction.

The collar clamp assembly according to the first embodiment has an extended length with inner and outer pairs of bulkheads formed in each of the housings. The outer pair of bulkheads are located adjacent to the respective ends of the housings, and the inner pair of bulkheads are located between and spaced from the outer pair of bulkheads. The first and second seals are located on the inner pair of bulkheads. The outer pair of bulkheads are sized to provide a generous gap between an inner circumferential surface thereof and an outer surface of the core spray piping to accommodate a misalignment of the piping. A side opening is defined by the housings and is configured to accommodate and allow an elbow of the core spray piping to protrude through a side wall near one end of the clamp assembly.

The collar clamp assembly according to the second embodiment has a shorter length and only one pair of bulkheads formed in each of the housings. The seals are located on the one pair of bulkheads, which are positioned on either side of the leaking pipe coupling to be repaired. The shorter length of this embodiment facilitates installation and makes the clamp assembly better adapted for certain applications.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A collar clamp assembly 10 according to a first embodiment of the present invention will be described below with reference to FIGS. 1 to 6 of the accompanying drawings.

Figure 1:
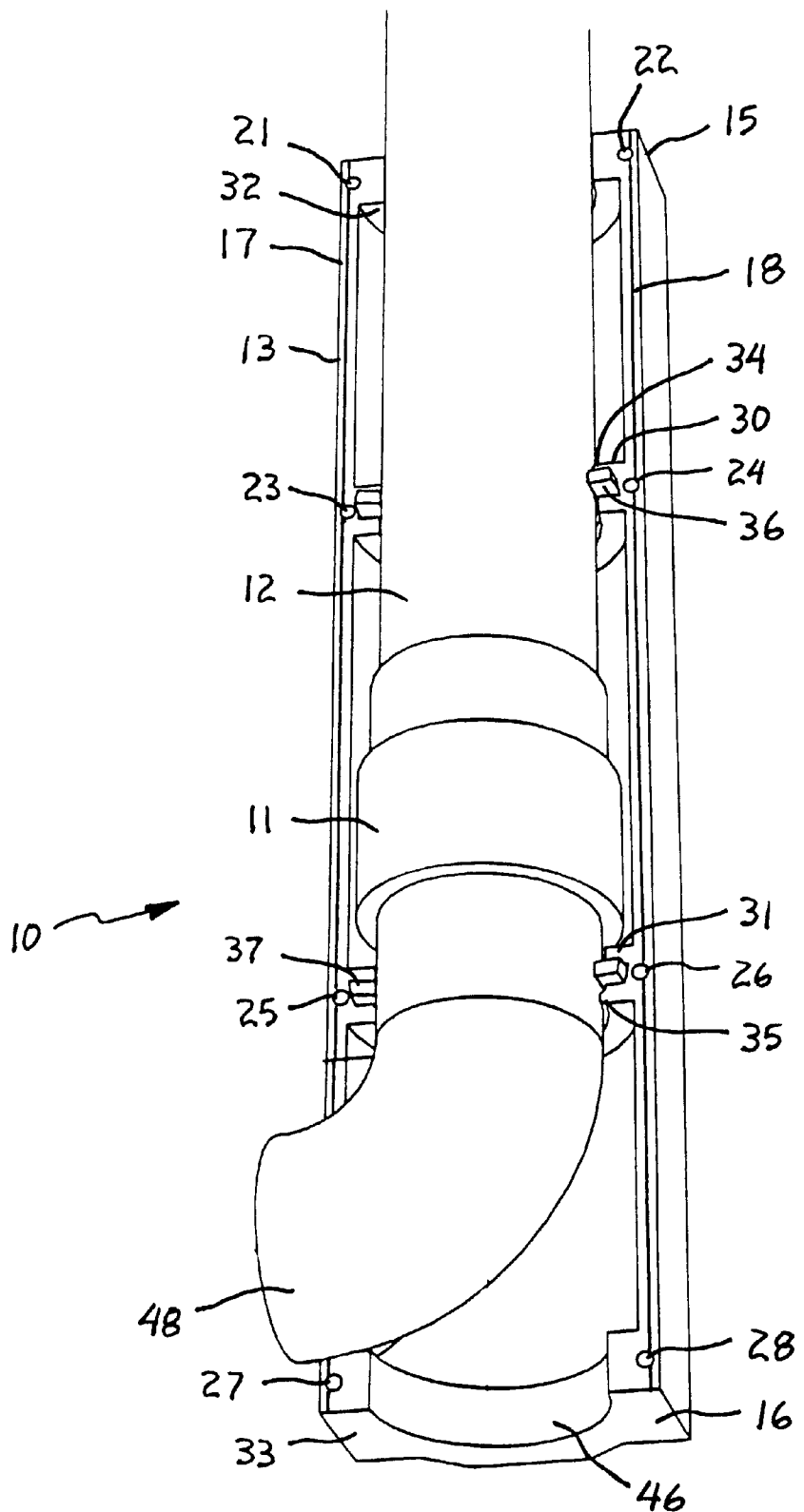
FIG. 1 is a perspective view of the collar clamp assembly according to a first embodiment of the present invention showing one of the housings fitted to a core spray piping of a nuclear reactor.
Figure 2:
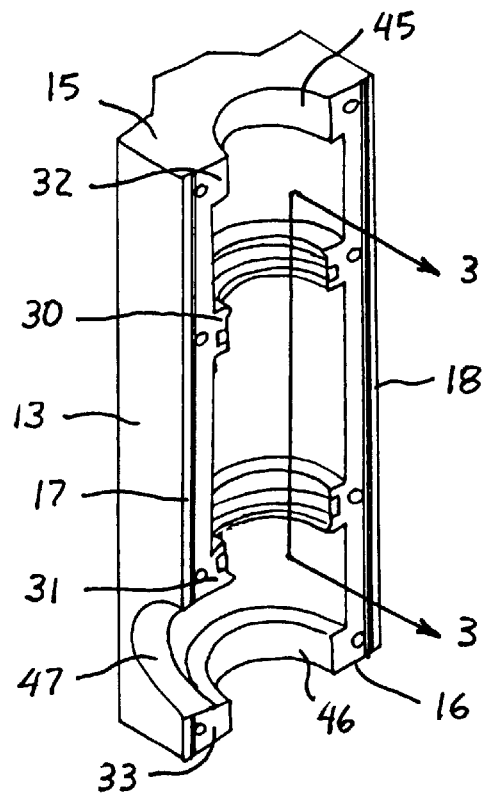
FIG. 2 is a perspective view of the housing of the collar clamp assembly shown in FIG. 1.
Figure 3:
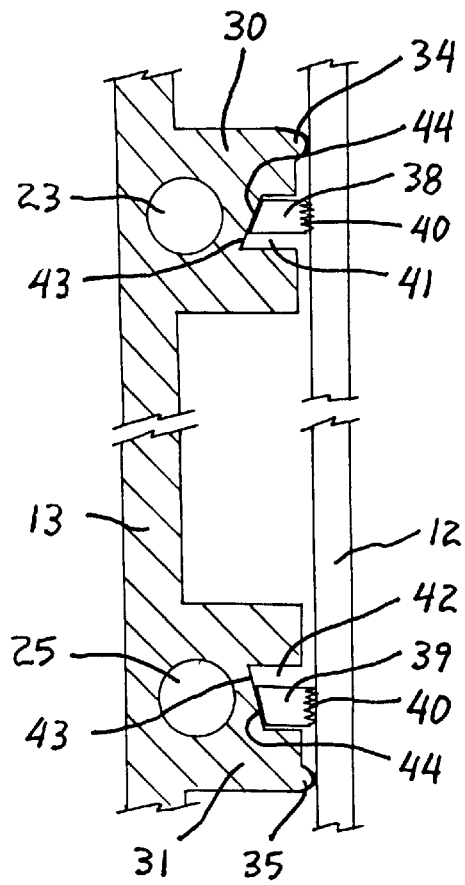
FIG. 3 is a cross-sectional side view of a portion of the housing taken along line 3—3 in FIG. 2 showing a sealing and gripping structure according to the first embodiment.
Figure 4:
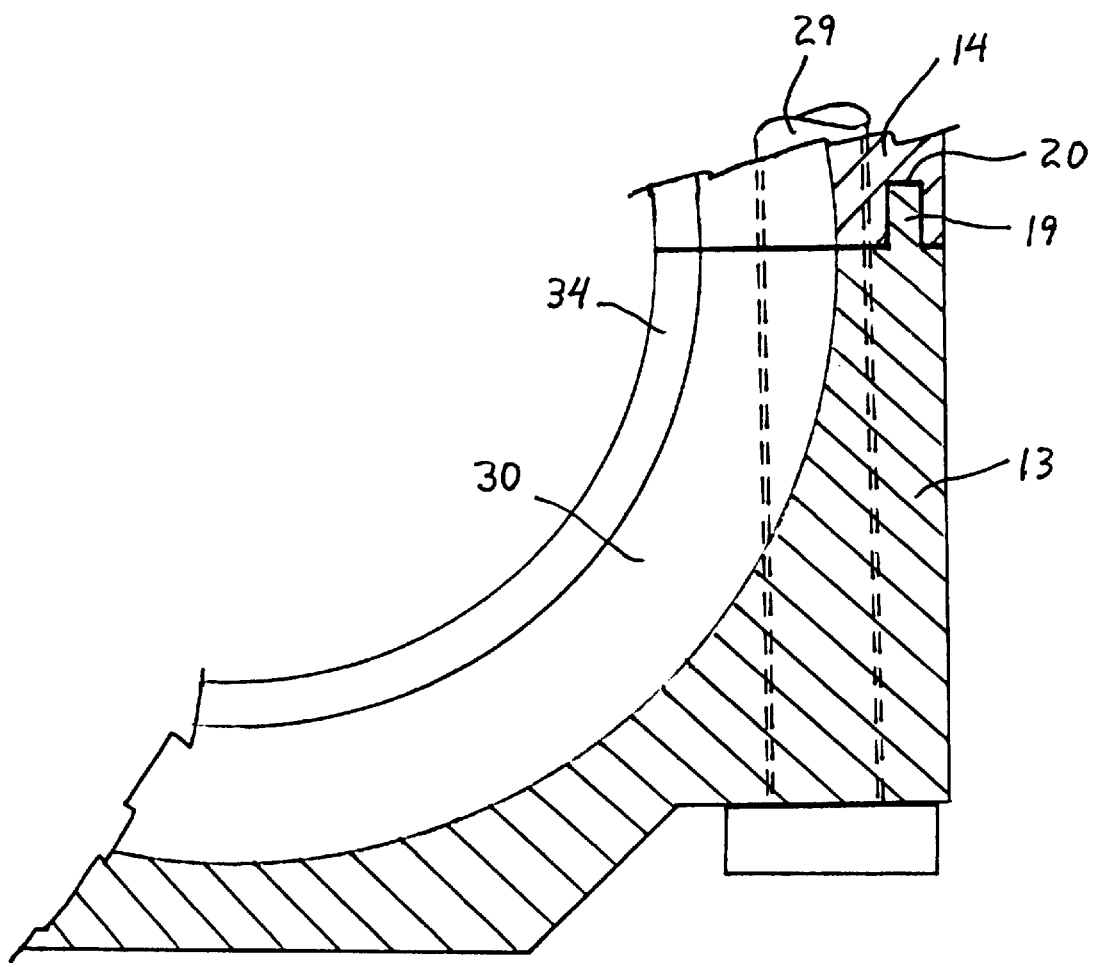
FIG. 4 is a cross-sectional end view of the collar clamp assembly showing a tongue and groove seal configuration between the mated housings of the assembly.

The collar clamp assembly 10 of the present invention has been developed for repairing and providing a temporary seal around leaking pipe coupling areas 11 of the core spray piping 12 of a nuclear reactor. The clamp assembly 10 includes first and second housings 13, 14, which are substantially mirror images of one another. In FIGS. 1 to 3, only one of the housings 13 is shown, and the other housing 14 has been omitted for clarity of illustration. A mating portion of the other housing 14 is shown in FIG. 4 together with a mating portion of the first housing 13.

The housings each have respective first and second ends 15, 16 and a pair of longitudinal edges 17, 18 that extend between the ends 15, 16. The housings 13, 14 are generally shaped to conform to the core spray piping 12 adjacent to the leaking pipe coupling areas 11 to be repaired. The housings have a tongue 19 and groove 20 mating configuration along the longitudinal edges 17, 18 to accommodate variations in the outside diameter of the core spray piping 12. The tongue 19 and groove 20 mating configuration is preferably made with a tight tolerance and is deep enough to allow the edges 17, 18 of the two housings 13, 14 to be apart and still provide an effective seal. The depth of the tongue 19 and groove 20 mating configuration is sufficient to accommodate variations in the outside diameter of the core spray piping 12 while still providing an effective seal along the longitudinal edges 17, 18.

A plurality of bores 21–28 are provided at spaced locations along each of the longitudinal edges 17, 18 of the housings 13, 14. Threaded fasteners 29 extend through the bores 21–28 to secure the first and second housings 13, 14 together. When the housings 13, 14 are secured together, they form a closed conduit shaped to receive a length of the core spray piping 12, including the leaking pipe coupling 11.

The housings 13, 14 each include first and second inner bulkheads 30, 31 at respective locations spaced inwardly from the ends 15, 16 of the housings 13, 14, and third and fourth outer bulkheads 32, 33 at the respective ends 15, 16 of the housings 13, 14. The bulkheads 30–33 are formed on the housings 13, 14 such that they protrude radially inwardly toward the core spray piping 12.

First and second seals 34, 35 are located on and extend circumferentially around the inner surfaces of the first and second bulkheads 30, 31, respectively. The seals 34, 35 are coaxial with each other and are oriented to seal the housings 13, 14 against the outer circumferential surfaces of the core spray piping 12 on either side of the leaking pipe coupling 11. The seals 34, 35 are in the form of raised metal rings, which are part of the first and second bulkheads 30, 31 and are sized to fit the minimum outside diameter of the piping 12 to be repaired. When the housings 13, 14 are clamped tightly to the core spray piping 12, the raised metal rings 34, 35 provide adequate temporary seals against the piping 12 despite variations in the outside diameter of the piping.

Grip structures 36, 37 configured to engage and grip an outer circumferential surface of the core spray piping 12 are provided adjacent to each of the seals 34, 35. The grip structures 36, 37 include gripping rings 38, 39 having a plurality of teeth 40 on an inner side facing the piping 12 to be gripped. The gripping rings 38, 39 are fit into respective grooves 41, 42 formed in the first and second bulkheads 30, 31. As shown in FIG. 3, the grooves 41, 42 each have a sloped bottom surface 43 that becomes shallower in a direction away from the pipe coupling 11 to be repaired. The outer sides 44 of the gripping rings 38, 39 facing the sloped bottom surfaces 43 of the grooves 41, 42 are sloped in a manner corresponding to the bottom surface 43 of the grooves 41, 42. With this configuration, the teeth 40 tend to bite harder into the pipe 12 if the pipe breaks and starts to pull apart in a longitudinal direction. As the pipe 12 starts to pull apart, the gripping rings 38, 39 slide along the sloped bottom surfaces 43 of the grooves 41, 42 causing the teeth 40 to be forced into tighter engagement with the pipe 12.

The third and fourth outer bulkheads 32, 33 each have an inner circumferential surface 45, 46 which is larger than the outer surface of the core spray piping 12 to accommodate any misalignment or angular offset created by the field welded slip joint coupling 11 of the piping. By providing the third and fourth bulkheads 32, 33 with a generous clearance, the installation of the collar clamp assembly 10 about the piping 12 is facilitated. The third and fourth bulkheads 32, 33 are provided primarily to absorb any offset moment introduced into the piping 12 as a result of a break. The offset moment could be the result of initial cold springing or hot pipe expansion forces. The core spray piping in a nuclear reactor can typically move only a limited distance upon breaking due to the supports on the vessel wall. The length of the housings 13, 14 and the distance between the third and fourth bulkheads 32, 33 are such that the broken pipe will continue to be accommodated within the housings 13, 14 should the gripping structure 36, 37 fail to keep the pipe 12 from pulling apart.

A side opening 47 extends through a side wall of the housings 13, 14 near a lower end of the clamp assembly 10 between the second and fourth bulkheads 31, 33. The side opening 47 is configured to accommodate and allow an elbow 48 of the core spray piping to protrude through the side wall of the housings 13, 14.

In operation, the first and second housings 13, 14, along with the gripping rings 38, 39 positioned within the sloped grooves 41, 42 of the first and second bulkheads 30, 31, are placed about a length of the core spray piping 12 to be repaired. The housings 13, 14 are positioned along the piping 12 such that the leaking pipe coupling 11 is located between the first and second bulkheads 30, 31. The threaded fasteners 29 are then inserted through the bores 21–28 along the longitudinal edges 17, 18 of the housings 13, 14 and tightened to clamp the housings 13, 14 to the piping 12. Upon tightening the threaded fasteners 29, the raised metal rings of the first and second seals 34, 35 and the gripping rings 38, 39 are pressed against the outer circumferential surface of the piping 12. The maneuvering of the housings 13, 14 into position on the piping 12 and the tightening of the threaded fasteners 29 can be performed easily from a remote location above the reactor vessel to minimize radiation exposure.

Figure 5:
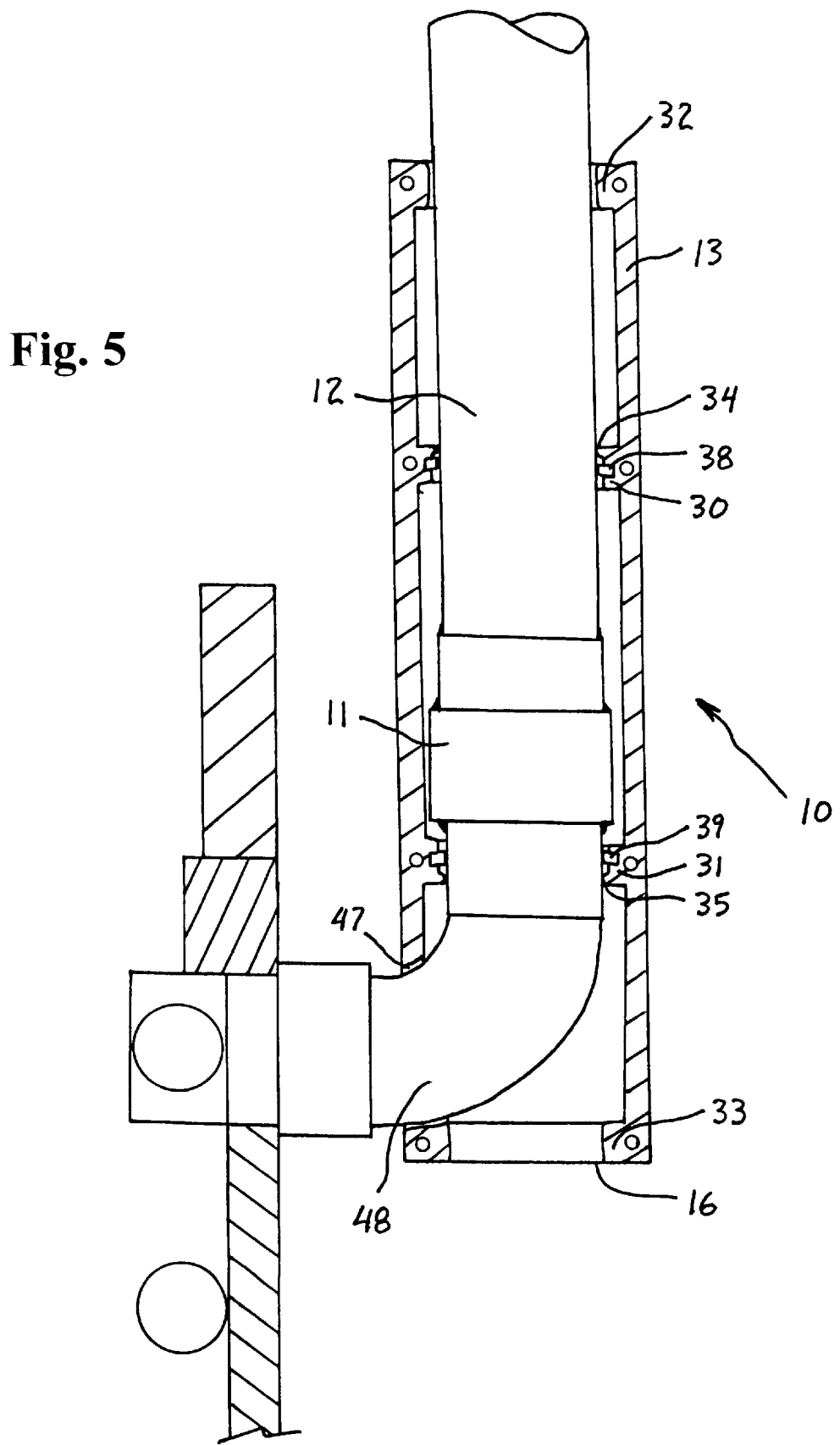
FIG. 5 is a cross-sectional side view of the collar clamp assembly according to the first embodiment fitted about a welded pipe coupling and elbow of the core spray piping.

As shown in FIG. 5, the clamp assembly can be fit to an upper core spray pipe 12 with an elbow 48 of the piping protruding through the side opening 47. In this case, the lower end 16 of the clamp assembly 10 remains open and the portions of the housings 13, 14 adjacent to the side opening 47 absorb any offset moment or vertical force introduced into the pipe 12 as a result of a break. The side opening 47 is provided with a generous clearance to allow easy installation.

Figure 6:
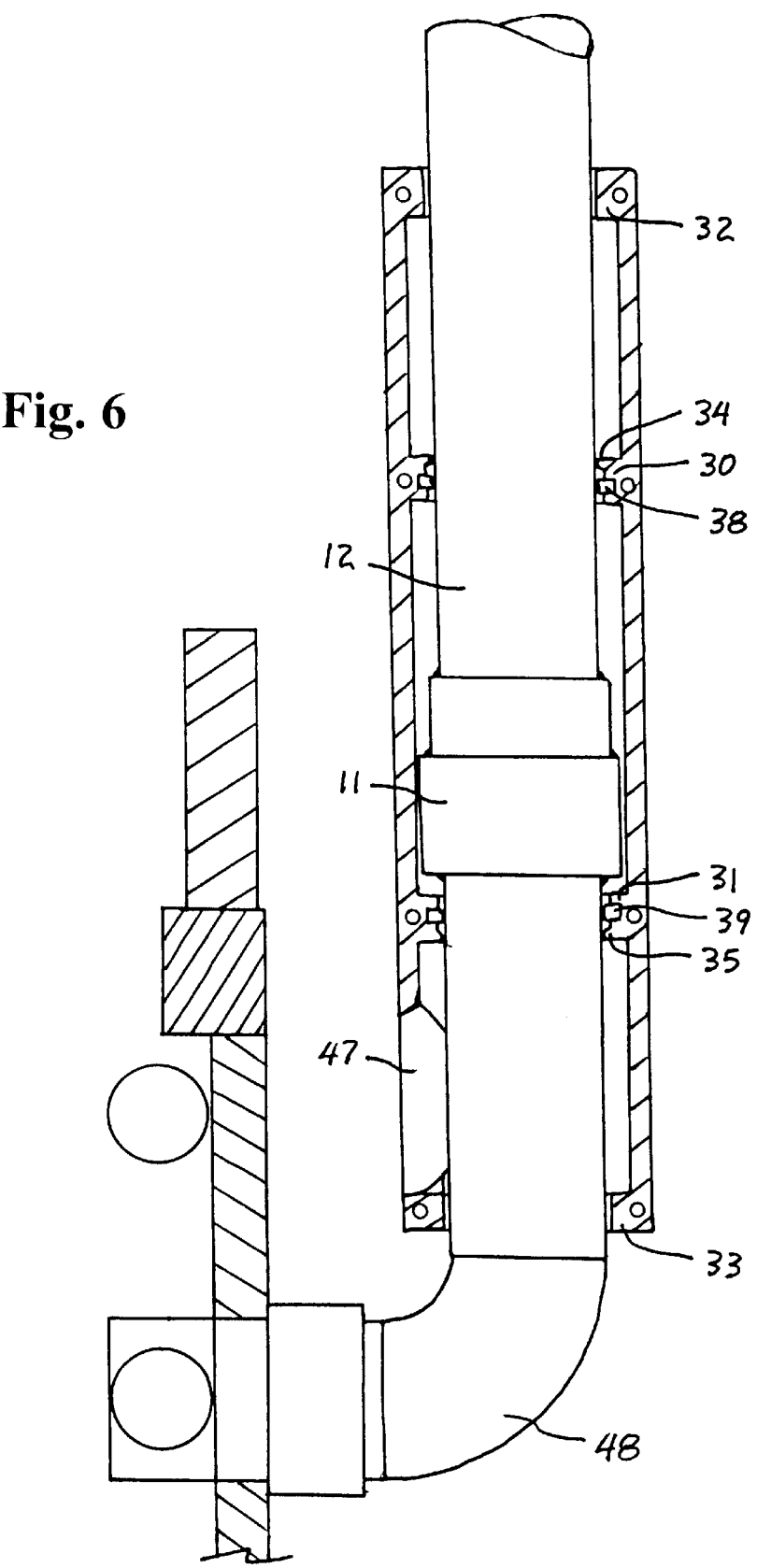
FIG. 6 is a cross-sectional side view of the collar clamp assembly according to the first embodiment fitted about another welded pipe coupling of the core spray piping.

As shown in FIG. 6, the clamp assembly 10 can also be fit to a lower core spray pipe 12 and positioned entirely above the elbow 48 of the piping. In this case, the core spray pipe 12 extends through the lower opening 46 of the clamp assembly 10 defined by the fourth bulkhead 33, and the side opening 47 defined by the housings 13, 14 is not used.

As a result of the above-described construction, the collar clamp assembly 10 can be installed quickly without any premeasurement of the piping 12. This makes the clamp assembly 10 ideal for repair as-found cracked conditions at a nuclear reactor plant. The camp assembly 10 of the present invention is not intended to be a permanent part of the reactor. Rather, the clamp assembly 10 is intended to provide a temporary fix to allow the owner of the reactor an additional fuel cycle to prepare for a permanent solution to the problem. By making the housings 13, 14 of the assembly 10 in two halves, the assembly can be used at any of the four downcomers of a typical core spray piping arrangement without modification.

Figure 7:
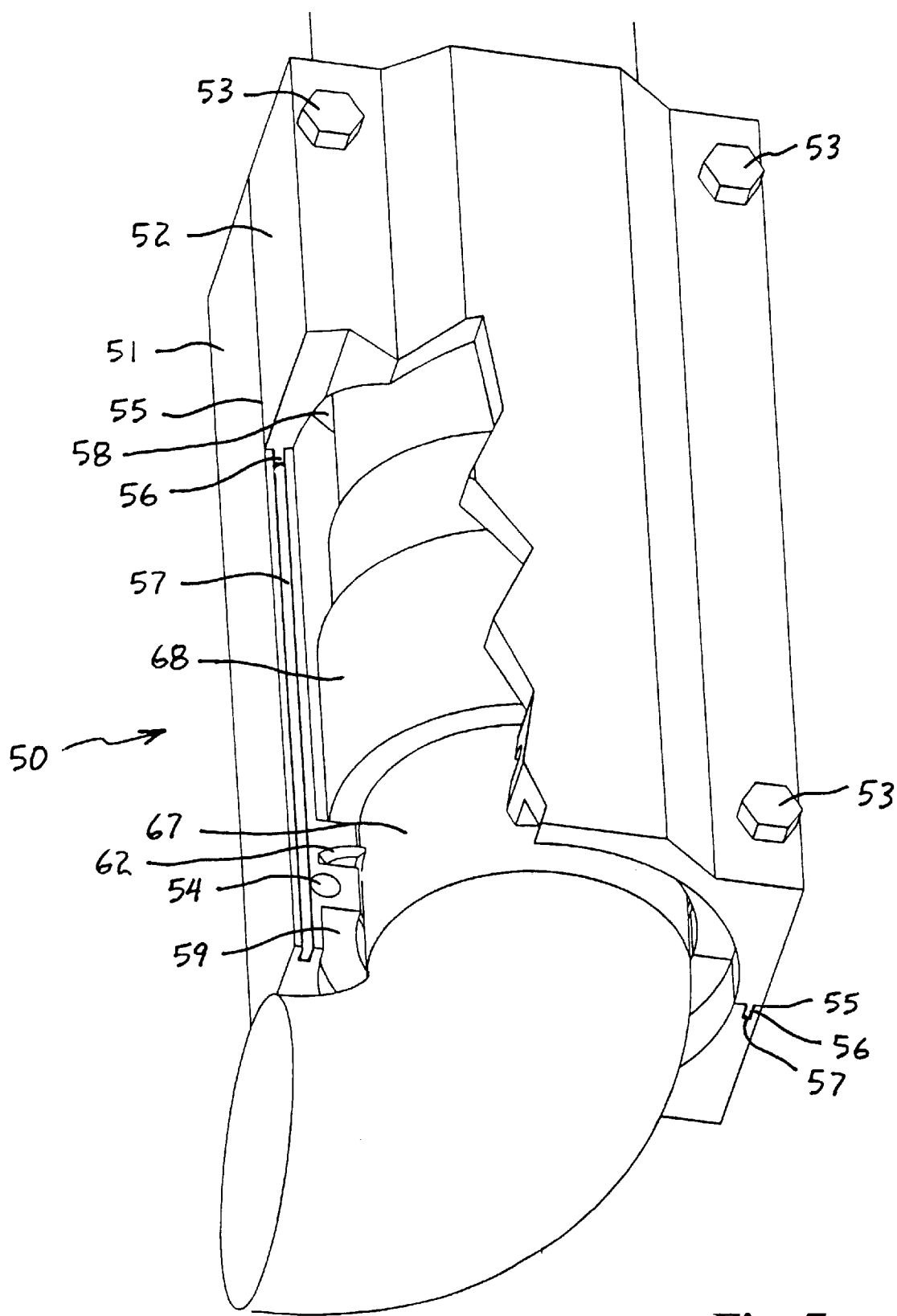
FIG. 7 is a cut away perspective view of a collar clamp assembly according to a second embodiment of the present invention.
Figure 8:
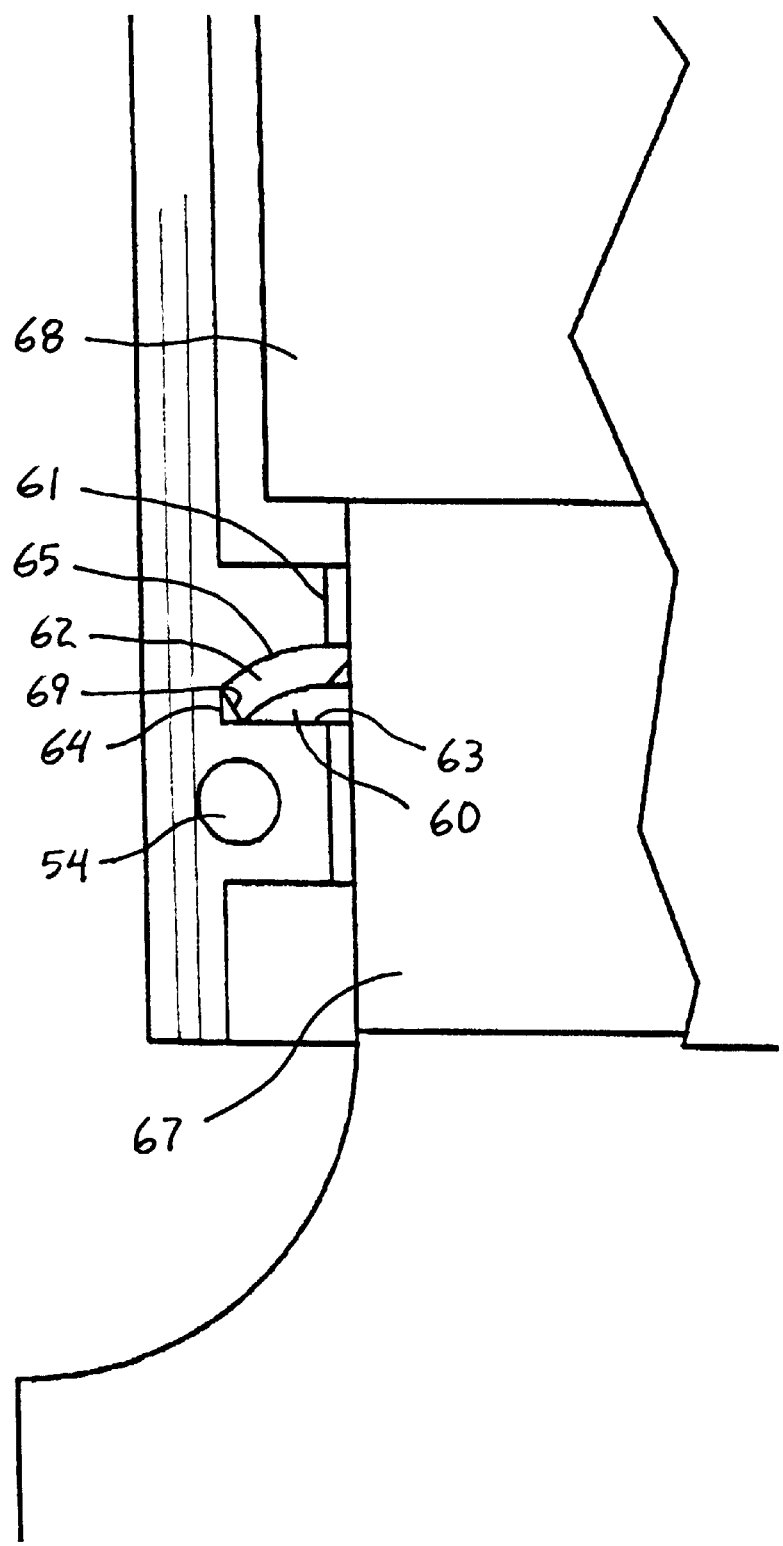
FIG. 8 is a cutaway side view of a portion of the collar clamp assembly according to the second embodiment.

A collar clamp assembly 50 according to a second embodiment of the present invention will now be described with reference to FIGS. 7 and 8 of the accompanying drawings.

The collar clamp assembly 50 according to the second embodiment provides a pipe repair apparatus that reduces the size and installation effort as compared with the collar clamp assembly 10 of the first embodiment described above.

The three core spray collar welds of the pipe coupling 11 that are most prone to cracking are covered by first and second housings 51, 52 of the clamp assembly 50, which are held together by a plurality of assembly bolts 53 extending through respective bores 54. The seals along the longitudinal edges 55 are provided by a close fit tongue 56 and groove 57 arrangement, as in the first embodiment. The seals and gripping structure and the length of the clamp assembly 50, however, are different from the first embodiment.

The clamp assembly 50 is provided with first and second bulkheads 58, 59 located at the respective ends of the housings 51, 52. In FIGS. 7 and 8, the details of the bulkhead 59 are shown, and the details of the other bulkhead 58, which is a substantial mirror image of the illustrated bulkhead 59, have been omitted for clarity of illustration.

A groove 60 is formed in the inner circumferential surface 61 of each of the bulkheads 58, 59 for receiving a locking ring seal 62. The groove 60 has a flat outer side surface 63, a bottom surface 64, and an arcuate inner surface 65. The locking ring seal 62 comprises a metal split washer that resembles a Belleville washer. The split washer 62 has a sharp inner edge 66 that engages the outer surface of the pipe 67 when the housings 51, 52 are clamped together via the assembly bolts 53. The inner edge 66 of the split washer 62 is angled toward the pipe coupling area 68 to be repaired. The locking ring seal 62 provides a combined seal and grip structure for the clamp assembly 50.

Once the housings 51, 52 are clamped together and the split washer 62 is engaged with the outer surface of the pipe 67, a break of the pipe coupling welds will cause the collar clamp assembly 50 to engage the surface of the pipe 66 tighter as the pipe parts are driven apart by internal pressure or mechanical loads. As the pipe 67 starts to separate in an axial direction, the split washer 62 is compressed into the groove 60 and rotated slightly in a manner that reduces an inner diameter of the sharp inner edge 66. Since the outer edge 69 of the split washer 62 is restrained by the groove 60, the pipe 67 is locked tightly by the split washer 62 and prevented from separating further as the longitudinal force increases. The result is an increased sealing force and a decreased tendency for the pipe 67 to separate in a longitudinal direction.

The clamp assembly 50 provides a temporary sealing device that prevents further crack propagation or a larger break, particularly where complete severance of the pipe coupling area 68 is a possibility. Thus, the clamp assembly 50 allows the reactor owner to effect long term repairs at the end of the normal fuel cycle and reactor shutdown.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A pipe repair apparatus, comprising:
    first and second housings, each housing comprising respective first and second ends and a pair of longitudinal edges between said ends, said housings being configured to mate along said longitudinal edges;
    a plurality of fasteners securing the first and second housings together to form a closed conduit between the ends, said conduit being shaped to receive a pipe to be repaired;
    a first seal located at a first position on each of said first and second housings and extending around said closed conduit, said first seal being oriented to seal the housings against an outer circumferential surface of the pipe to be repaired;
    a second seal located at a second position on each of said first and second housings which is spaced longitudinally from said first position, said second seal extending around said closed conduit and being oriented to seal the housings against an outer circumferential surface of the pipe to be repaired; and
    a grip means for restraining a pipe to be repaired from pulling apart in a longitudinal direction;
    wherein said grip means comprises a first gripping ring positioned adjacent to said first seal, and a second gripping ring positioned adjacent to said second seal, said gripping rings each having teeth configured to engage and grip an outer circumferential surface of the pipe to be repaired, said gripping rings being arranged such that the teeth bite harder into the surface of the pipe if the pipe begins to pull apart.

2. The pipe repair apparatus according to claim 1, wherein said longitudinal edges define a tongue and groove configuration that provides a seal along said longitudinal edges while allowing said housings to accommodate different outside diameters of a pipe to be repaired.

3. The pipe repair apparatus according to claim 1, wherein said first and second seals each comprise raised metal rings formed on inner circumferential surfaces of said first and second housings.

4. The pipe repair apparatus according to claim 1, wherein said first and second seals are formed in first and second bulkheads, respectively, defined by said housings.

5. A pipe repair apparatus, comprising:
    first and second housings, each housing comprising respective first and second ends and a pair of longitudinal edges between said ends, said housings being configured to mate along said longitudinal edges;
    a plurality of fasteners securing the first and second housings together to form a closed conduit between the ends, said conduit being shaped to receive a pipe to be repaired;
    a first seal located at a first position on each of said first and second housings and extending around said closed conduit, said first seal being oriented to seal the housings against an outer circumferential surface of the pipe to be repaired; and
    a second seal located at a second position on each of said first and second housings which is spaced longitudinally from said first position, said second seal extending around said closed conduit and being oriented to seal the housings against an outer circumferential surface of the pipe to be repaired; and
    third and fourth bulkheads defined at the respective first and second ends of the housings, said first and second bulkheads being positioned between and spaced from said third and fourth bulkheads;
    wherein said first and second seals are formed in first and second bulkheads, respectively, defined by said housings.

6. The pipe repair apparatus according to claim 5, wherein said third and fourth bulkheads are sized to provide a gap between an inner circumferential surface thereof and an outer surface of the pipe to be repaired to accommodate a misalignment of the pipe.

7. The pipe repair apparatus according to claim 1, further comprising a side opening defined by said housings which is configured to accommodate and allow an elbow of the pipe to protrude through a side wall of the housings.

8. A pipe repair apparatus, comprising:
    first and second housings, each housing comprising respective first and second ends and a pair of longitudinal edges between said ends, said housings being configured to mate along said longitudinal edges;
    a plurality of fasteners securing the first and second housings together to form a closed conduit between the ends, said conduit being shaped to receive a pipe to be repaired;
    a first seal located at a first position on each of said first and second housings and extending around said closed conduit, said first seal being oriented to seal the housings against an outer circumferential surface of the pipe to be repaired; and
    a second seal located at a second position on each of said first and second housings which is spaced longitudinally from said first position, said second seal extending around said closed conduit and being oriented to seal the housings against an outer circumferential surface of the pipe to be repaired; and
    a side opening defined by said housings which is configured to accommodate and allow an elbow of the pipe to protrude through a side wall of the housings;
    wherein said first and second seals are formed in first and second bulkheads, respectively, defined by said housings, and a third bulkhead is defined at an end of said housings, said side opening being provided between said second and third bulkheads.

9. The pipe repair apparatus according to claim 1, wherein said first and second seals are formed in first and second bulkheads, respectively, defined by said housings adjacent to said first and second ends of said housings.

* * * * *